INVENTOR.
WALTER G. CHANDLER
BY
*G A Gust*
ATTORNEY

2,888,100
WHEEL AND BRAKE ASSEMBLY

Walter G. Chandler, South Bend, Ind., assignor to Bendix Aviation Corporation, South Bend, Ind., a corporation of Delaware Application June 15, 1951, Serial No. 231,770

3 Claims. (Cl. 188—18)

The present invention relates to a wheel and brake assembly which is especially suited for use on aircraft.

A principal object of the present invention is to provide a wheel and brake assembly which is easily disassembled for servicing and repair. In the accomplishment of this object, the present invention provides a construction in which the removal of a single retaining element enables the disassembly of the wheel from the wheel and brake assembly. With the wheel thus removed, the other parts of the assembly, namely the brake, is fully exposed and accessible for close examination and servicing.

It is another object of this invention to provide a wheel and brake assembly which has large carrying and braking capacity in a relatively light, compact, and small overall assembly.

It is another object of the present invention to provide an arrangement for swivelling or steering the assembly without interfering with the desirable servicing attributes mentioned above.

Other objects will become apparent as the description proceeds.

Figure 1:
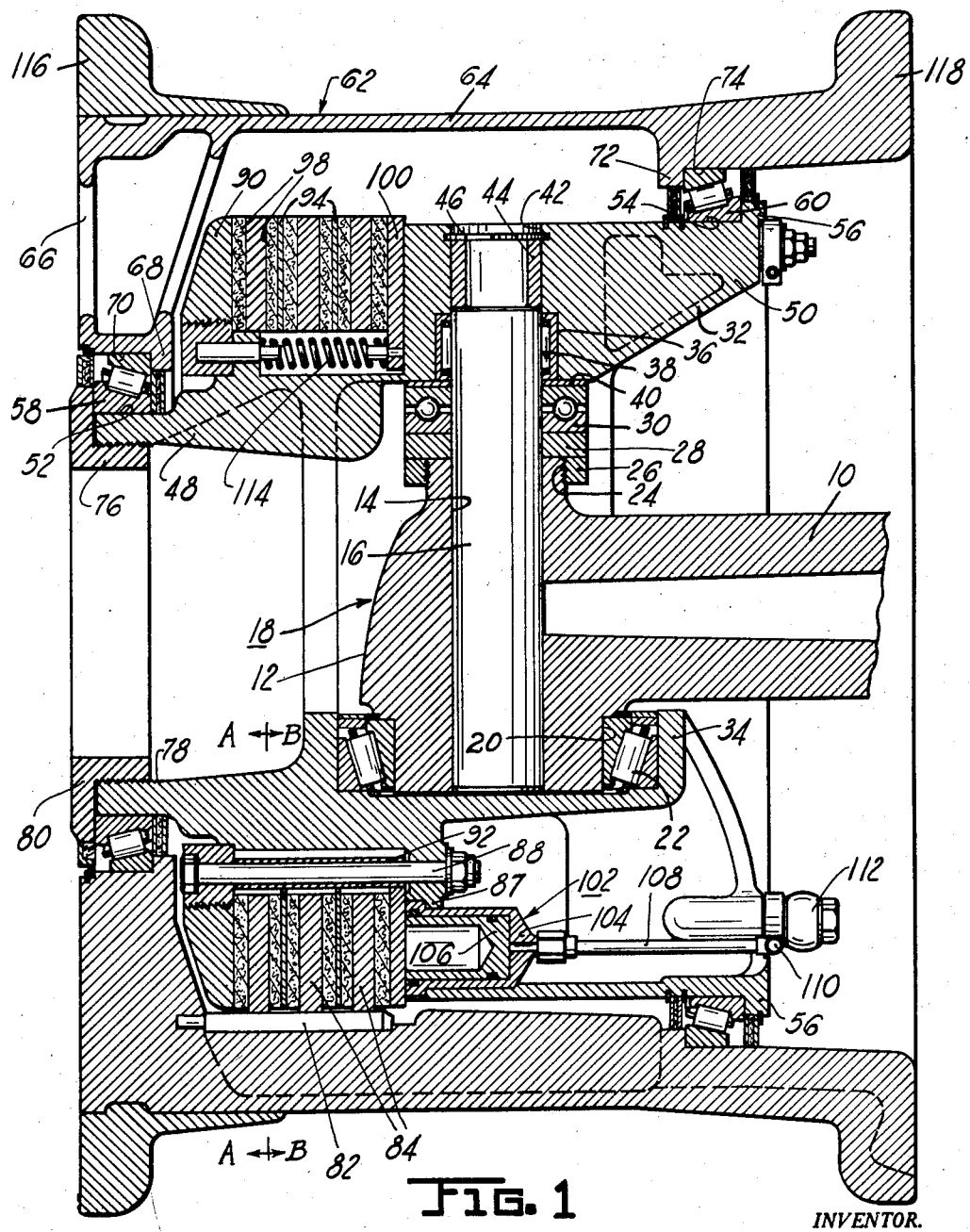
Figure 1 is an axial section of an embodiment of the present invention.
Figure 2:
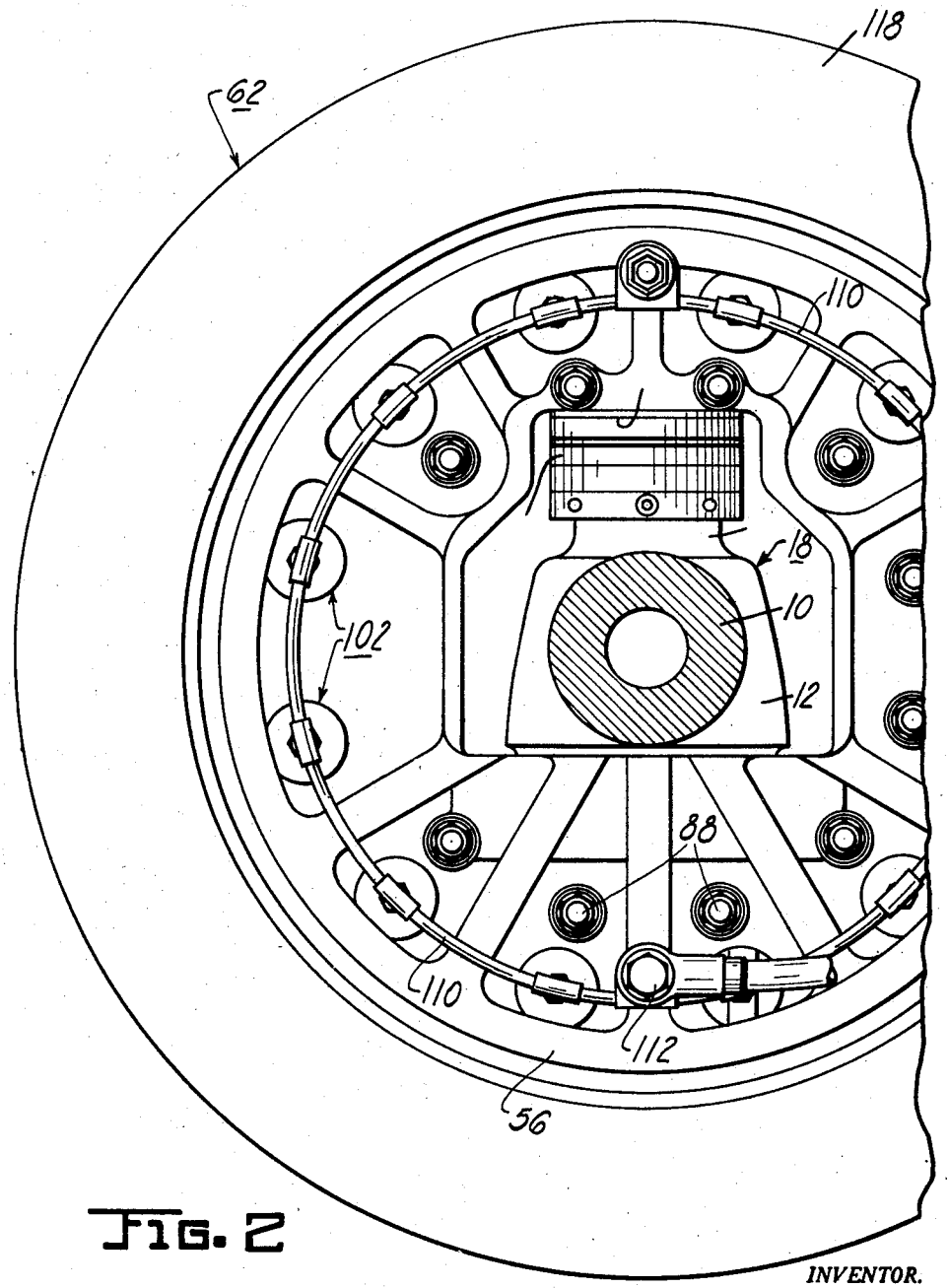
Figure 2 is a partial side elevation of Figure 1 showing the stationary axle in cross section and viewed from the inboard side.
Figure 3:
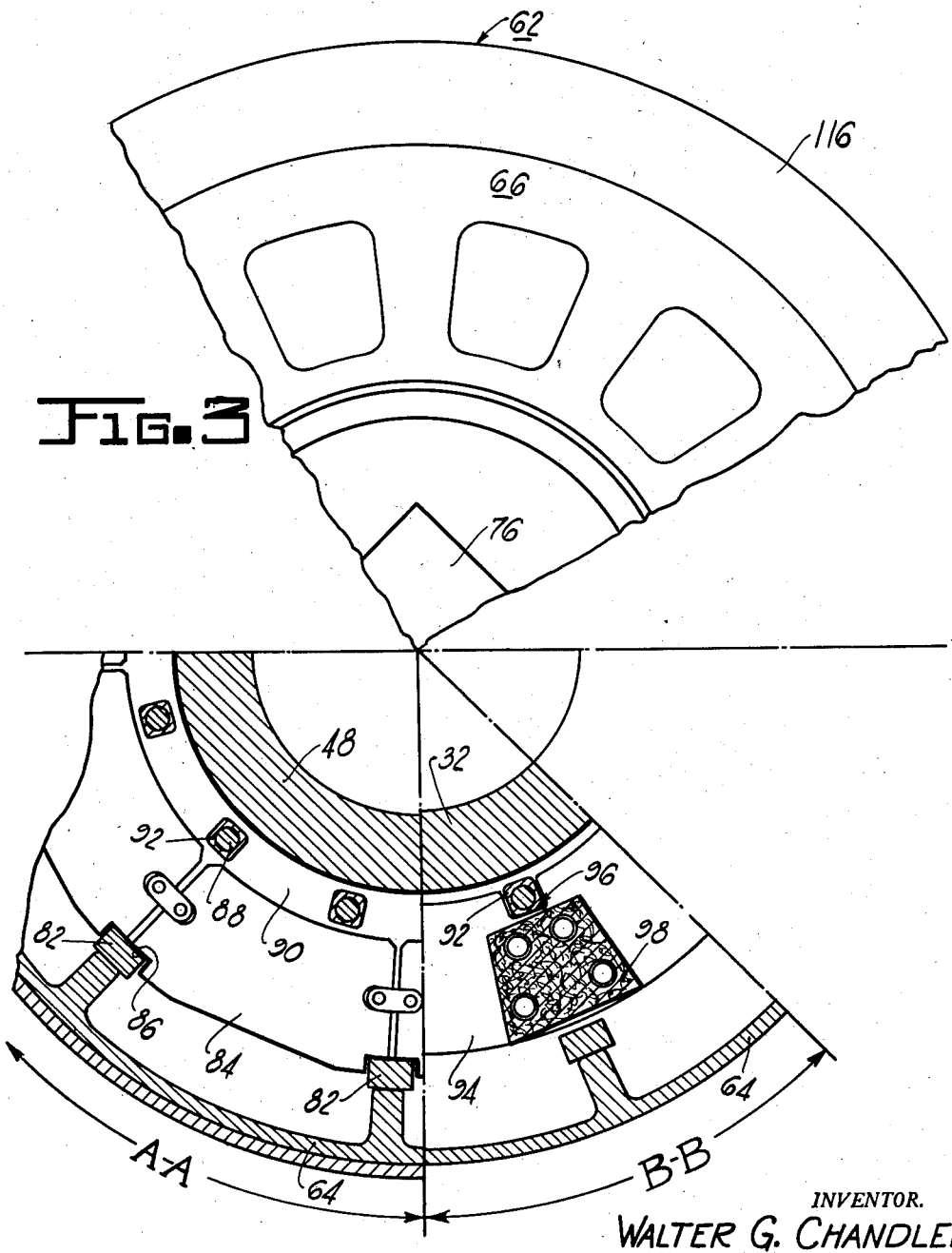
Figure 3 is a partial side elevation taken on the side opposite to that shown in Figure 2 and showing partial sections taken on section lines A—A and B—B respectively of Figure 1.

Referring now to the drawings, and more particularly to Figure 1, the stationary hollow axle 10 is provided on its end with a generally cylindrical pivot member 12 which is hollowed out to decrease its weight and also to provide a socket 14 for receiving a pivot pin 16. This pivot pin 16 projects from the upper end of the pivot member 12, and the axis thereof is formed substantially perpendicular to that of the axle 10. The combination of the pivot member 12 and the pivot pin 16 may be characterized as a knuckle or pivot assembly generally indicated by the reference numeral 18. The lower end of the pivot member 12 is provided with a bearing surface 20 concentric with the axis of the knuckle assembly 18 for receiving the tapered bearing assembly 22 for a purpose which will hereafter become apparent. The upper end of the pivot member 12 is threaded at 24 to receive an adjusting ring 26 which abuts a spacing or bearing ring 28 surrounding pin 16. A thrust bearing assembly 30 is positioned on top the ring 28 and serves a purpose which will be explained more fully hereafter.

A castering hub or supporting member 32 is pivotally mounted on the knuckle assembly 18 and is provided at its lower inner periphery with a cup shaped portion 34 dimensioned to operatively engage the thrust bearing 22. The upper portion of the hub 32 is provided with a socket 36 which pivotally engages the pivot pin 16 by means of the needle bearing assembly 38. Engaging the top side of the thrust bearing assembly 30 and surrounding pin 16 is a thrust washer 40 which bears against the inner peripheral surface of the hub 32. By this arrangement, the hub 32 may be freely pivoted around the knuckle assembly 18 and around an axis perpendicular to the axis of the axle 10.

The upper portion of the hub 32 is provided with another substantially radial bore or socket 42 which is formed about the same axis as that of socket 36 and which has a diameter substantially coextensive with that of the pin 16. An assembly for locking the pivot pin 16 in position is provided in the form of a tubular member 44 which is held downwardly against the top portion of pin 16 by means of a split retaining washer 46. As seen more clearly in Figure 1, the washer 46 fits into a suitable groove formed in the bore 42.

Coaxial bearing surfaces 52 and 54 are formed on the different sized bearing portions 48 and 50 respectively of hub 32. On the inboard side of the hub 32 adjacent the edge of bearing surface 54 is provided a radially outwardly extending bearing flange 56 which serves a purpose to be more fully explained hereafter. Taper bearing assemblies 58 and 60 are received on the bearing surfaces 52 and 54 respectively. It should be noted at this point that these bearings 58 and 60 have different diameters with the large diameter bearing 60 being located on the inboard side of the hub 32. A wheel 62 having a rim 64 and only one side plate 66 is rotatably mounted on hub 32. This mounting is provided by means of the radially inwardly extending flange 68 provided on side plate 66 and also the bearing surface 70 adapted to engage the outer periphery of the bearing assembly 58, and a radially inwardly extending bearing flange 72 formed on the inner periphery of rim 64 adjacent the inboard side thereof. To the right of the flange 72 is formed a bearing surface 74 adapted to engage the outer periphery of the bearing assembly 60. The exact positioning of the bearing 60 is effected by having the flanges 56 and 72 on the opposite sides of the bearing 60 as shown in Figure 1. It should also be noted that the bearing flange 68 on the wheel side 66 engages the inboard side of the bearing 58. A hub nut or retaining element 76 is threadedly received in the opening 78 of the small bearing portion 48, and is provided with a radially outwardly flaring shoulder 80 which engages the outboard side of bearing 58 thereby retaining the bearing 58 and the wheel 62 in position on the hub 32. By the facile expedient of removing the hub nut 76, the entire wheel 62 may be withdrawn to the left or outboard side of the assembly thereby exposing completely the hub 32 and any parts carried thereby.

A plurality of circumferentially spaced axially extending keys 82 are secured to the wheel near the outer periphery thereof. A plurality of axially spaced friction disks or elements 84 slidably engage the keys 82 by means of the notches 86 for axial movement and for rotation with the wheel 62. A radially outwardly extending supporting portion 87 is formed on the hub 32 and is arranged to receive therethrough a plurality of circumferentially spaced axially extending fastening bolts 88 which serve to rigidly secure the threaded type backing plate 90 to the hub 32. Sleeve type keys 92 are received on the bolts 88 between the backing plate or reaction member 90 and the supporting portion 87 and serve to take the braking torque of the non-rotatable friction disks 94 which are keyed thereto by means of the notches 96. These rotatable and nonrotatable disks 84 and 94 are interleaved, with friction lining 98 being provided on the nonrotatable disks for engagement with the adjacent surfaces of the disks 84. A nonrotatable pressure plate or member 100 is also keyed against rotation but for axial movement on the sleeves 92 and when moved toward the left serves the purpose of compressing the disks 84 and 94 against the reaction member 90.

Hydraulic actuation means 102 is provided for moving the pressure plate to cause frictional engagement of the disks 84 and 94 and comprises in the illustrated embodiment of a plurality of axially extending circumferentially spaced piston type actuators, each actuator consisting of a cylinder 104 secured to hub flange 87 by any suitable means and a piston 106 reciprocably received in the cylinder 104 and arranged to engage pressure plate 100.

Fluid pressure-carrying conduits 108 extend axially outwardly from the cylinders 104 and communicate with the heads of the pistons 106. A circular conduit 110 interconnects all of the individual conduits 108 and terminates in a fitting 112 adapted to be connected with a source of controllable hydraulic pressure.

Return springs 114 may be interposed between the reaction member 90 and pressure plate 100 and serve the purpose of releasing braking engagement of the friction disks after brake application.

The operation of the brake is as follows, by injecting pressure into conduit 110, the pistons 106 are forced outwardly and against the pressure plate 100 which is in turn forced to the left compressing the friction disks 84 and 94 together and against the backing plate 90. For brake release, the fluid pressure injected into the conduit 110 is relieved thereby allowing the return springs 114 to force the pressure plate 100 and pistons 106 back to their illustrated positions.

While the swivelling or castering action of the wheel and brake assembly about the knuckle assembly 18 is obvious from the foregoing description, it should be noted that the axis of the knuckle assembly is substantially coincident with the diameter of wheel 64 and is located substantially midway between the sides 116 and 118 of the wheel 62. With this arrangement the forces tending to pivot the wheel may be balanced tending to provide a true trailing condition; however, it should be understood that slight inclinations or changing in positions of this axis may be effected for obtaining desired results without departing from the scope of this invention.

Ready access to the brake or hub may be gained by simply removing the hub nut 76 and by merely withdrawing the wheel 62 from assembled position. Brake parts are then completely exposed and may be peripherally examined, and also may be disassembled without interference from any portion of the wheel structure. Disassembly of the hub 32 from the axle 10 may follow by simply removing the locking ring 46 from the hub bore 42, and removing the pivot pin 16 from its socket 14 in the pivot member 12. The bearing 30 and spacer 28 may then be removed allowing the hub 32 to drop down thus providing clearance between the bearing cup 34 and the lower extremity of the pivot member 12. The hub 32 may then be withdrawn to the left from the axle 10 thereby completing the major disassembly of the disclosed construction.

In order to facilitate its retraction into the storage compartment provided in an aircraft wing or fuselage, wheel 62 must be turned about pivot pin 16 to a position which will permit its insertion into the limited space of the compartment. It should be noted that the combination of bearings 22 and 30 provides a means whereby the wheel may be easily pivoted about pin 16 to accomplish the aforesaid turning. When the wheel leaves the ground, its weight will be taken by bearing 30 rather than by bearing 22. Elimination of bearing 30 would necessitate a friction surface between washer 40 and the top of member 12. Obviously, such a friction surface would make turning difficult and require a larger actuating mechanism for accomplishing turning. By using the present bearing combination a smaller actuating mechanism can be utilized thereby reducing the overall weight of the assembly.

Another advantage derived from the use of the large bearing 60 is the provision of an overall wheel and brake assembly having relatively narrow dimensions for a given wheel-carrying and braking capacity. By eliminating one wheel side, the axial space normally occupied by this side may be taken by the supporting structure, such as the wheel hub 32, the wheel hub thereby serving the dual function of taking the load from the corresponding portion of the wheel 62 and serving as a carrier for certain of the brake parts.

Although only one embodiment of the invention has been illustrated and described, various changes in the form and relative arrangements of the parts may be made to suit requirements.

I claim:

1. A dirigible aircraft wheel and brake assembly comprising a stationary axle having a transverse pivot member on one end thereof, a pivot pin axially extending from one end of said pivot member, a supporting member pivotally mounted on said pivot member and said pivot pin, one portion of said supporting member engaging said pivot pin while an opposite portion of said supporting member engages said pivot member, two spaced bearing portions of different diameters provided on said supporting member, a wheel having a rim and only one side plate which rotatably engage the large and small diameter bearing portions respectively, the axis of said pivot pin and pivot member substantially coinciding with a diameter of said wheel and being disposed substantially midway between the lateral sides of said wheel, and a disk brake having a diameter dimension intermediate the diameter dimensions of said spaced bearing portions, said disc brake being carried by said supporting member and having friction members located between said axis and said one wheel side plate, said brake being provided with an actuator carried by the large diameter portion of said supporting member and actuable to produce frictional engagement of said friction members.

2. A dirigible aircraft wheel and brake assembly comprising a stationary axle having an integral pivot member on one end which has an axis extending transversely of said axle, said pivot member being provided with a bore having an axis substantially coincident with the first-mentioned axis, a pivot pin received in said bore and having one end projecting therefrom, a supporting member pivotally supported about the axis of said pivot member and having one socket which rotatably engages the projecting pivot pin end and another socket which rotatably engages the end of said pivot member opposite said pin end, two spaced different diameter bearing portions provided on said supporting member, a wheel having a rim and only one side plate which rotatably engage the large and small diameter bearing portions respectively, the axis of said pivot pin and pivot member substantially coinciding with a diameter of said wheel and being disposed substantially midway between the lateral sides of said wheel, and a disk brake having a diameter dimension smaller than said larger diameter bearing and being carried by said supporting member and having friction members located between the pivot pin axis and said one wheel side plate, said brake being provided with an actuator carried by the large diameter portion of said supporting member and actuable to produce frictional engagement of said friction members.

3. A dirigible aircraft wheel and brake assembly comprising a stationary axle having a knuckle assembly on one end thereof, a supporting member pivotally mounted on said knuckle assembly and being provided with large and small sections on opposite sides of said knuckle assembly, two different diameter bearing portions one provided on each of said sections and on opposite sides of said knuckle assembly, a wheel having a rim and only one side plate and being rotatably supported on said supporting member, said one side plate rotatably engaging the small bearing portion while the rim rotatably engages the large bearing portion, the axis of said knuckle assembly being substantially coincident with a diameter of said wheel and being disposed substantially midway between the wheel sides, and a disk brake carried by said supporting member and having friction members located between the axis of said knuckle assembly and said one wheel side.

References Cited in the file of this patent

UNITED STATES PATENTS

| | | | |
|---|---|---|---|
| 886,990 | Krieger | May 5, | 1908 |
| 1,086,251 | Weatherwax | Feb. 3, | 1914 |
| 1,142,334 | Layman | June 8, | 1915 |
| 1,226,809 | Ramsay | May 22, | 1917 |
| 1,635,708 | Cassel | July 12, | 1927 |
| 1,938,030 | Lambert | Dec. 5, | 1933 |
| 1,983,751 | Goodyear et al. | Dec. 11, | 1934 |
| 2,157,473 | Best | May 9, | 1939 |
| 2,173,737 | Ulinski | Sept. 19, | 1939 |
| 2,254,198 | Ash | Sept. 2, | 1941 |
| 2,303,041 | Glacy | Nov. 24, | 1942 |
| 2,331,159 | Ash | Oct. 5, | 1943 |
| 2,398,348 | Ash | Apr. 16, | 1946 |
| 2,417,854 | Barrish | Mar. 25, | 1947 |
| 2,423,011 | Du Bois | June 24, | 1947 |
| 2,616,525 | Du Bois | Nov. 4, | 1952 |
| 2,648,571 | Chapin | Aug. 11, | 1953 |
| 2,671,532 | Du Bois | Mar. 9, | 1954 |
| 2,672,220 | Collier | Mar. 16, | 1954 |

FOREIGN PATENTS

| | | | |
|---|---|---|---|
| 458,757 | Canada | Aug. 9, | 1949 |
| 336,287 | France | Oct. 28, | 1903 |
| 360,714 | France | Mar. | 1906 |
| 482,791 | Great Britain | Apr. 5, | 1938 |